March 18, 1947. L. J. HIBBARD 2,417,755
PLURAL SERIES ALTERNATING CURRENT MOTOR CONTROL SYSTEM
Filed July 28, 1945 5 Sheets-Sheet 5

INVENTOR
Lloyd J. Hibbard.
BY
G. M. Crawford
ATTORNEY

Patented Mar. 18, 1947

2,417,755

UNITED STATES PATENT OFFICE 2,417,755

PLURAL SERIES ALTERNATING CURRENT MOTOR CONTROL SYSTEM

Lloyd J. Hibbard, Forest Hills, Pa., assignor to Westinghouse Electric Corporation, East Pittsburgh, Pa., a corporation of Pennsylvania Application July 28, 1945, Serial No. 607,536

15 Claims. (Cl. 172—179)

My invention relates, generally, to control systems and, more particularly, to systems for controlling the operation of electric locomotives.

It is the usual practice to accelerate electric locomotives which are driven by alternating-current motors of the series type by connecting the motors to successive taps on a power transformer, thereby increasing the voltage applied to the motors in a step-by-step manner. The duty imposed on the transformer and the tap-changing equipment naturally becomes more severe as the horsepower rating of a locomotive is increased and one of the objects of my invention is to distribute the motor ampere loading over the secondary winding of the power transformer on a locomotive more uniformly than is the case with prior low tension notching system.

Another object of my invention is to distribute more uniformly the duty imposed on the tap-changing switches of a tap-changing system.

A further object of my invention is to provide a relatively large number of accelerating steps with a relatively small number of tap-changing switches.

Still another object of my invention is to reduce the surge currents and sag-back effects usually encountered in a tap-changing system.

A still further object of my invention is to provide a system for controlling the operation of the tap-changing switches of a tap-changing system.

Another object of my invention is to provide for cutting one or more of the motors of a locomotive out of service without affecting the operation of the remaining motors.

A more general object of my invention is to reduce the size, weight and cost of the tap-changing equipment for alternating-current locomotives having high horsepower ratings.

Other objects of my invention will be explained fully hereinafter or will be apparent to those skilled in the art.

According to the present invention, the traction motors of a locomotive are divided into two groups with one group connected to one end of the secondary winding of the power transformer and the other group connected to the other end of the transformer. The voltage applied to the motors is varied by means of two banks of tap-changing switches which are transferred from one group of motors to the other at the mid-point of the accelerating cycle. Balance coils or a buck-boost transformer may be connected in the motor circuits to equalize the motor voltages and to permit a motor to be cut out of service without affecting the operation of the remaining motors.

For a fuller understanding of the nature and objects of my invention, reference may be had to the following detailed description, taken in conjunction with the accompanying drawing, in which.

Referring to the drawings, and particularly to Figs. 1A, 1B, 3 and 4, the system shown therein comprises a plurality of motors 1, 2, 3 and 4 which may be of a type suitable for propelling an electric locomotive (not shown). As shown, the motors are arranged in two groups, the motors 1 and 2 having terminals connected to one end of the secondary winding 17 of a transformer T through contact members LS1 of a switch LS and winding BC1 of a balance coil BC. The corresponding terminals of the motors 3 and 4 are connected to the other end of the secondary winding 17 of the transformer T through contact members LS2 of the switch LS, and a winding BC2 of the balance coil BC. The primary winding 18 of the transformer T may be energized from a trolley conductor 19 through a current collector 20.

Figure 1A:
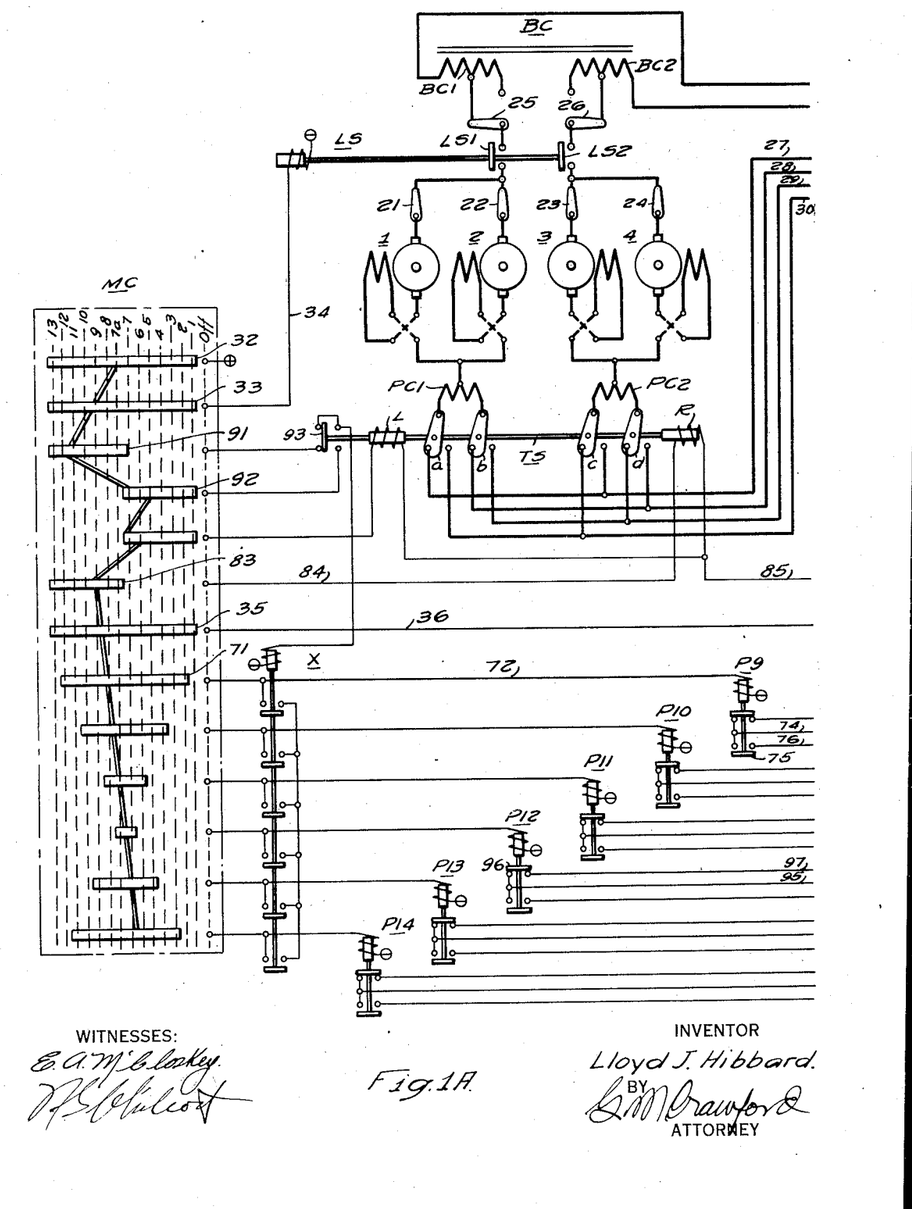
Figures 1A and 1B constitute a diagrammatic view of a control system embodying my invention.
Figure 1B:
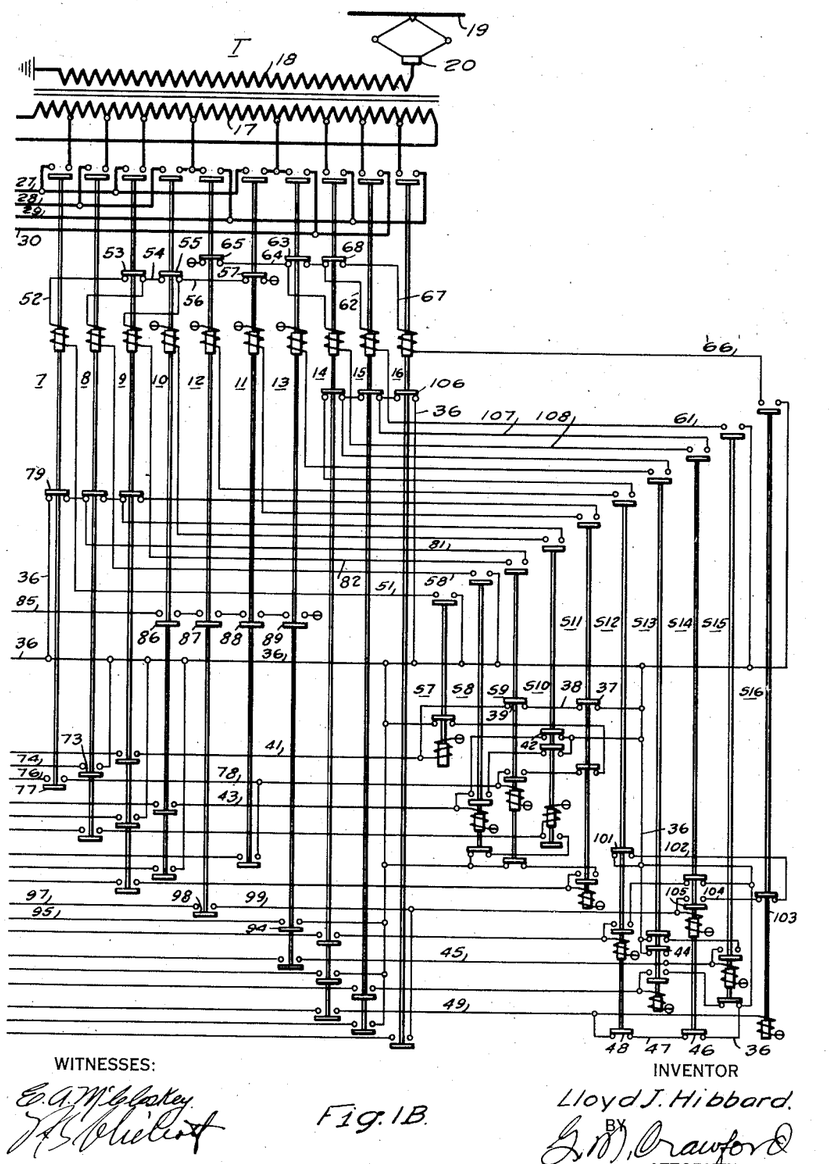
Figure 3:
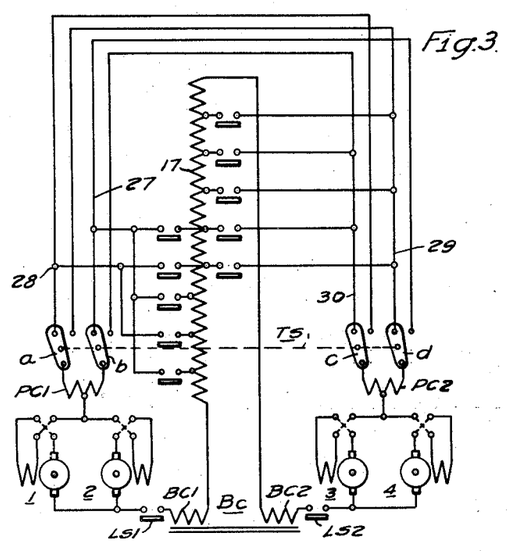
Fig. 3 is a schematic diagram of the main circuits shown in Figs. 1A and 1B.

In order that one or more of the motors may be cut out of service in case it becomes defective, switches 21, 22, 23 and 24 are provided for opening the circuits through the motors 1, 2, 3 and 4, respectively. With a view to preventing unbalance in the motor voltages in case one of them is cut out of service, switches 25 and 26 are provided for changing taps on the balance coil winding BC1 and BC2, respectively. When all of the motors are in operation, the currents through the balance coil windings are equal, thereby equalizing the voltages applied to the motors. If one of the motors is cut out of service, the other motor of that group will draw only half the amount of current that the two motors normally draw. Therefore, it is necessary to change the connections to the balance coil winding for that group of motors to double the number of turns in the balance coil winding, thereby maintaining the same number of effective ampere turns in the motor circuit.

In order to increase the voltage applied to the motors during the accelerating cycle, the other terminals of the motors are connected to the secondary winding 17 of the transformer T through two banks of tap-changing switches. Thus, tap-changing switches 7, 8, 9, 10 and 11 constitute one bank of switches and are connected to buses 27 and 28. Likewise, switches 12, 13, 14, 15 and 16 constitute the other bank of switches and are connected to buses 29 and 30.

In order to reduce the total number of tap-changing switches and at the same time provide a relatively large number of voltage steps during the accelerating cycle, a transfer switch TS is provided for transferring the motors from one bank of switches to the other at substantially the mid-point of the accelerating cycle. The transfer switch TS is provided with contact members $a$ and $b$ which connect the motors 1 and 2 to the buses 27 and 28, through a preventive coil PC1 during the first part of the accelerating cycle. Likewise, contact members $c$ and $d$ of the switch TS connect the motors 3 and 4 to the buses 29 and 30 through a preventive coil PC2.

The switch TS is provided with an actuating coil L which operates the switch to the left-hand position as shown in the drawing and a coil R which operates the switch to the right-hand position when energized. The switch is of a type which remains in the position to which it was last actuated until the coil for actuating it to the other position becomes energized. In this manner the switch TS may be operated to transfer the motors 1 and 2 from the buses 27 to 28 to the buses 29 and 30 and the motors 3 and 4 from the buses 29 and 30 to the buses 27 and 28, thereby transferring the motors from one bank of tap-changing switches to another during the accelerating cycle. Thus, the voltage applied to each group of motors may be gradually increased through the entire range of voltage between the terminals of the secondary winding 17 of the transformer T with a relatively small number of tap-changing switches, since two steps or notches are obtained for each tap-changing switch, whereas in the usual tap-changing schemes only one notch is obtained per switch.

Furthermore, the traction motor ampere loading is more uniformly distributed over the secondary winding than is true for previously known tap-changing schemes, where all of the motors are connected to one end of the transformer winding.

Also, the duty imposed upon the tap-changing switches is more uniformly distributed during the accelerating cycle, since the switches which must handle the heavy current during the first part of the accelerating cycle are used later on to handle the lighter current when the motors are operating at higher speeds. The surge current duties and sag-back effects usually encountered in tap-changing schemes of the present type are lessened, because the balance coils are so connected that they cannot increase the transients through the tap-switch preventive coils at the instant of tap-switch closure. The balance coil also permits the application of uniform increases in the voltages applied to the motors by alternately notching first one bank of switches and then the other bank, as indicated by the sequence chart shown in Fig. 4.

The mechanical size of the transformer is relatively small since one-half of the taps to the transformer winding may be brought out on one side and the other half of the taps may be brought out on the other side of the transformer. In this manner twice as many taps may be provided for a given height of the transformer.

The operation of the tap-changing switches and the transfer switch TS is controlled by a master controller MC, progression relays P9, P10, P11, P12, P13 and P14, sequence relays S7, S8, S9, S10, S11, S12, S13, S14, S15 and S16 and an interlocking relay X. The progression relays and the sequence relays cooperate to control the sequence operation of the tap-changing switches in a step-by-step manner, regardless of whether or not the controller MC is actuated step-by-step or is actuated through its complete range in one operation. However, the progression may be stopped at any desired point by holding the controller on that step or notch.

The interlocking relay X functions to insure the operation of the transfer switch TS to transfer the motors from one bank of tap switches to the other at the proper time during the accelerating cycle. The tap-changing switches are provided with interlocking contact members, part of which cooperate with the interlocking relay X in the control of the operation of the transfer switch TS and the remainder of which cooperate with the progression relays and the sequence relays to insure the proper sequence of operation of the tap-changing switches and to prevent the simultaneous closing of two switches which are connected to a common bus.

Figure 4:
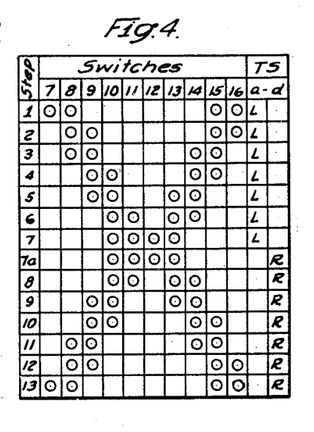
Fig. 4 is a chart showing the sequence of operation of the switches illustrated in Fig. 3.

Referring to Figs. 3 and 4, it will be seen that the tap-changing switches 7 and 8 of one bank and 15 and 16 of the other bank are closed on the first accelerating step. The contact members $a$ to $d$ of the transfer switch TS are in the left-hand position, thereby connecting the motors 1 and 2 to the buses 27 and 28, which, in turn, are connected to the bank of switches including the switches 7 to 11. Likewise, the motors 3 and 4 are connected to the buses 29 and 30 which in turn are connected to the bank of switches including switches 12 to 16.

As indicated by the sequence chart in Fig. 4, the switches 9, 10 and 11 and 14, 13 and 12 are closed in sequential relation, thereby gradually increasing the voltage applied to the motors. Following the closing of the switch 12, the transfer switch TS is operated to the right-hand position, thereby transferring the motors 1 and 2 to the buses 29 and 30 and the motors 3 and 4 to the buses 27 and 28. This transfer is made under equipotential conditions. Following the operation of the transfer switch, the switches 9, 8 and 7 and the switches 14, 15 and 16 are reclosed in the reverse sequence to increase the voltage applied to the motors to the maximum voltage obtainable from the transfer secondary winding 17, thereby completing the accelerating cycle.

In order that the functioning of the foregoing apparatus may be more clearly understood, the operation of the system will now be described in more detail. When the controller MC is actuated to position "1," the line switch LS is closed. The sequence relays S7, S8, S15 and S16 are closed, thereby closing the tap-changing switches 7, 8, 15 and 16 as indicated by the sequence chart in Fig. 4. The transfer switch TS remains in the left-hand position where it was returned as the controller MC was actuated to the "off" position, following a previous acceleration of the motors.

The energizing circuit for the switch LS may be traced from positive through segments 32 and 33 of the controller MC, conductor 34 and the actuating coil of the switch LS to negative. The energizing circuit for the sequence relay S7 extends from segment 35 on the controller MC through conductor 36, an interlock 37 of the sequence relay S11, conductor 38, interlock 39 on the sequence relay S9, conductor 41 and the actuating coil of the relay S7 to negative. The energizing circuit for the sequence relay S8 extends from the conductor 36 through an interlock 42 on the sequence relay S10, conductor 43 and the actuating coil of the relay S8 to the negative. The circuit for the sequence relay S15 extends from the conductor 36 through an interlock 44 on the sequence relay S13 and conductor 45 through the actuating coil of the relay S15 to the negative. The circuit for the sequence coil S16 extends from the conductor 36 through an interlock 46 on the sequence relay S14, conductor 47, interlock 48 on the sequence relay S12, conductor 49 and the actuating coil of the relay S16 to negative.

The closing of the sequence relays S7, S8, S15 and S16 establishes circuits for energizing the actuating coils of the tap switches 7, 8, 15 and 16, respectively. The circuit for the switch 7 extends from the conductor 36 through the contact members of the relay S7, conductor 51, the actuating coil of the switch 7, conductor 52, an interlock 53 on the tap switch 9, conductor 54, an interlock 55 on the tap switch 10, conductor 56 and an interlock 57 on the tap switch 11 to negative. The circuit for the switch 8 extends from the conductor 36 through the contact members of the relay S8, conductor 58, the coil of the switch 8 and thence to negative through the interlocks 55 and 57 of the switches 10 and 11, respectively, as previously traced. The circuit for the switch 15 extends from the conductor 36 through the contact members of the relay S15, conductor 61, the coil of the switch 15, conductor 62, interlock 63 on the switch 13, conductor 64 and an interlock 65 on the switch 12 to negative. The circuit for the switch 16 extends from the conductor 36 through the contact members of the relay S16, conductor 66, the coil of the switch 16, conductor 67, an interlock 68 on the switch 14 and thence to negative through the interlocks 63 and 65 on the switches 13 and 12, respectively, as previously explained.

When the controller MC is actuated to position "2" the progression relay P9 is energized, thereby operating the sequence relay S9, which, in turn, energizes the actuating coil for the tap switch 9. The energizing circuit for the progression relay P9 extends from a segment 71 on the controller MC through conductor 72 and the actuating coil of the relay P9 to negative. The energizing circuit for the sequence relay S9 extends from the conductor 36 through an interlock 73 on the tap switch 8, conductor 74, contact members 75 of the relay P9, conductor 76, interlock 77 on the switch 7, conductor 78 and the actuating coil of the relay S9 to negative.

The closing of the relay S9 opens its interlock 39, thereby deenergizing the sequence relay S7 which opens its contact members to deenergize the circuit for the actuating coil of the tap switch 7, permitting this switch to open. Following the opening of the switch 7, the actuating coil of the switch 9 is energized to close this switch. The energizing circuit for the actuating coil of the switch 9 extends from the conductor 36 through an interlock 79 on the switch 7, conductor 81, the contact members of the relay S9, conductor 82, the actuating coil of the switch 9, conductor 56 and the interlock 57 of switch 11 to negative.

When the controller MC is actuated to position "3," the progression relay P14, the sequence relay S14 and the tap switch 14 are closed in a manner similar to the operation of the progression relay P9, the sequence relay S9 and the tap switch 9, previously explained. Likewise, the tap switches 10, 13, 11 and 12 are closed as the controller is actuated through positions "4," "5," "6" and "7," respectively.

When the controller is actuated to position "7a," the transfer switch TS is actuated to the right-hand position. The energizing circuit for the coil R of the transfer switch may be traced from a segment 83 on the controller MC through conductor 84, the coil R, conductor 85, interlock members 86, 87, 88 and 89 of the switches 10, 12, 11 and 13, respectively, to negative. As explained hereinbefore, the operation of the transfer switch TS to the right-hand position transfers the motors 1 and 2 to the bank of tap-changing switches containing the switches 10 to 16, inclusive, and the motors 3 and 4 to the bank of tap-changing switches containing the switch 10 to 11, inclusive.

It will be noted that the interlocking relay X is operated momentarily as the controller is actuated from position "7" to position "7a" in view of the overlapping of contact segments 91 and 92 on the controller MC. As explained hereinbefore, the function of the interlocking relay X is to insure the proper operation of the transfer switch TS as a result of the closing of the tap switches 10, 11, 12 and 13 in the event that the master controller is actuated to a position past the normal transfer position prior to the closing of these tap switches.

It will be seen that if the controller MC is actuated past the position "7a" prior to the operation of the transfer switch TS, the actuating coil of the relay X is energized through the contact segment 91 and the interlocking member 93 carried by the switch TS. Thus, the relay X is operated to energize the progression relays, which, in turn, insure the operation of the tap switches 10, 11, 12 and 13, thereby providing for the energization of the coil R of the transfer switch in a manner hereinbefore described. The momentary operation of the relay X, which takes place in the event the controller is actuated in a step-by-step manner, insures that the relay X is kept in an operating condition.

When the controller MC is actuated to position "8" the progression relay P12 is deenergized, which, in turn, deenergizes the sequence relay S12 and the tap switch 12 and energizes the tap switch 14. The energizing circuit for the sequence relay S14 extends from the conductor 36 through an interlock 94 on the tap switch 13, conductor 95, contact member 96 of the progression relay P12, conductor 97 and interlock 98 on the tap switch 12, conductor 99 and the actuating coil of the sequence relay S14 to negative. A holding circuit for the relay S14 is established from the conductor 36 through an interlock 101 on the relay S12, conductor 102, an interlock 103 on the relay S16, conductor 104 and an interlock 105 on the relay S14.

The closing of the relay S14 energizes the coil of the tap switch 14 through a circuit which extends from a conductor 36 through an interlock 106 on the tap switch 16, conductor 107, the contact members of the relay S14, conductor 108, the actuating coil of the switch 14 and the interlock 65 on the switch 12 to negative.

When the controller MC is actuated to position "9" the tap switch 11 is opened and the switch 6 closed as a result of the opening of the progression relay P11 and sequence relay S11 and the closing of the sequence relay S9. Likewise, the tap switches 15, 8, 16 and 7 are closed as the controller MC is actuated through positions "10," "11," "12" and "13," thereby completing the accelerating cycle.

In order to simplify the drawing and description, only a relatively few tap-changing switches have been shown. It will be understood that additional tap switches may be provided, if desired, and their operation controlled in a manner similar to the operation of the switches herein illustrated and described.

Figure 2A:
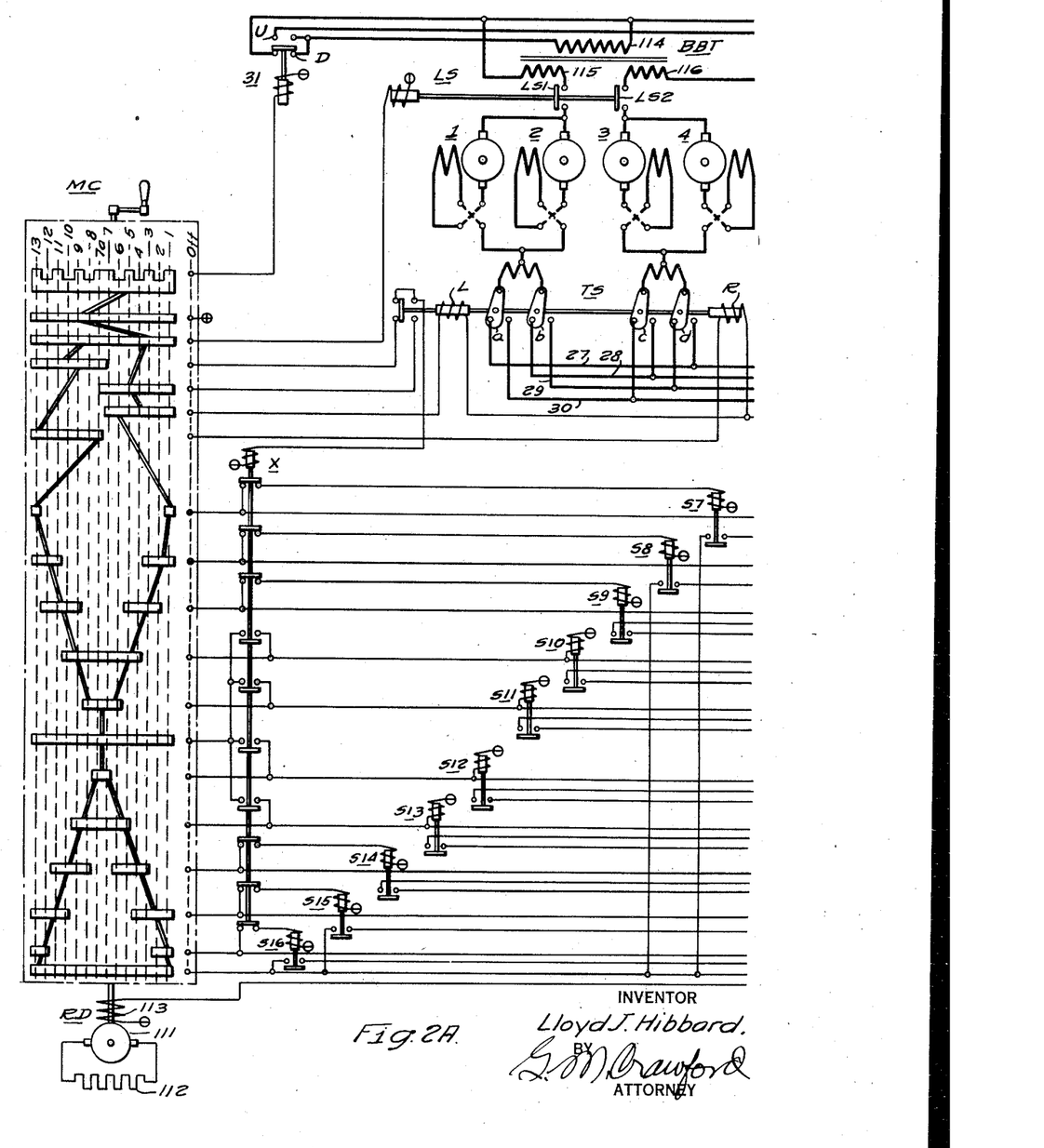
Figs. 2A and 2B constitute a diagrammatic view of a control system embodying a modified form of my invention.
Figure 2B:
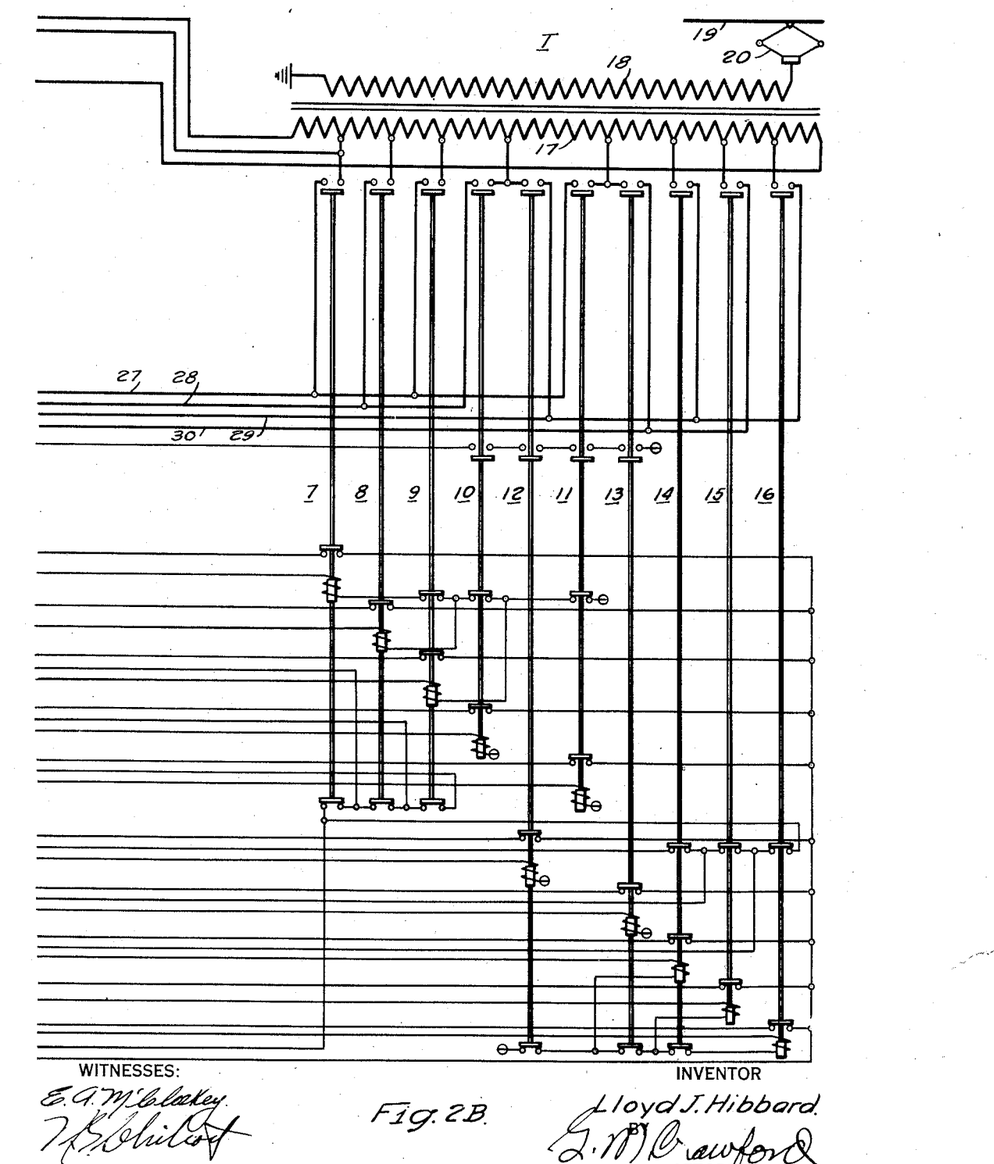
Figure 5:
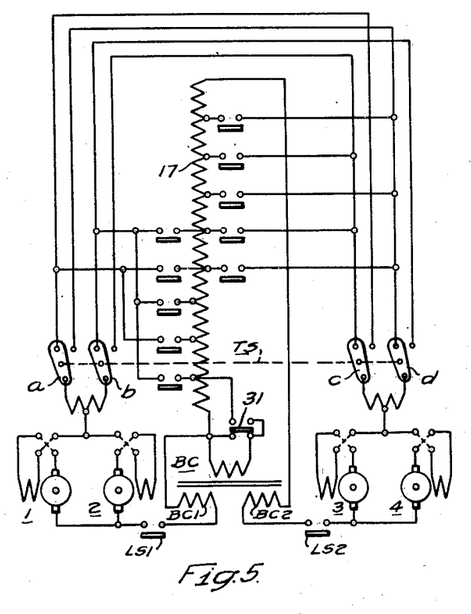
Fig. 5 is a schematic diagram of the main circuits shown in Figs. 2A and 2B.
Figure 6:
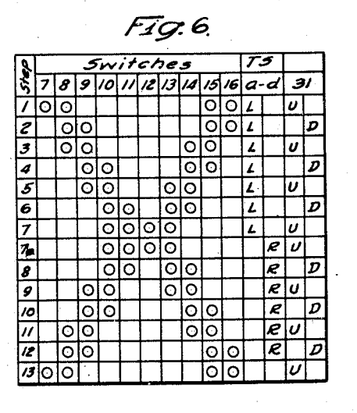
Fig. 6 is a chart showing the sequence of operation of the switches illustrated in Fig. 5.

In the modification of the invention shown in Figs. 2A and 2B and the schematic diagram in Fig. 5 and sequence chart in Fig. 6, the apparatus is similar to that hereinbefore described, with the exception that the progression relays have been omitted, a buckboost transformer BBT is provided in place of the balance coil BC, a switch 31 is provided for controlling the energization of the primary winding of the buckboost transformer and a retardation device RD is provided for controlling the operation of the manually operable controller MC.

Since the progression relays has been omitted, it is essential for the proper operation of the system that the controller MC be actuated in a step-by-step manner and that the position of the controller should not get ahead of the progression of the tap-changing switches. As shown, the retardation device RD comprises a motor having an armature 111 which is connected to the shaft of the controller MC. A resistor 112 is connected across the armature 111 and provision is made for energizing a field winding 113 of the motor through interlocking members provided on the tap-changing switches.

Thus, if the operator attempts to advance the controller faster than the progression of the tap-changing switches takes place, the field winding 113 is energized. This causes a current to circulate through the armature winding and the motor functions as a brake to make it difficult for the operator to advance the controller any further until the progression of the tap-changing switches has caught up with the position of the controller, at which time the field winding 113 is deenergized.

The interlocking relay X functions in a manner hereinbefore described to insure the proper operation of the transfer switch TS at substantially the mid-point of the accelerating cycle even though the controller MC should be advanced past the mid-position before the proper tap-changing switches have closed.

The buckboost transformer BBT functions to equalize the voltages applied to the two groups of motors during the tap-changing operation. The buckboost transformer is provided with a primary winding 114 and two secondary windings 115 and 116. The secondary windings are so disposed that one adds to and the other subtracts from the main transformer voltage when the primary winding 114 is energized from a section of the secondary winding 17 of the main transformer T.

When the switch 31 is in its lowermost position, the transformer winding 114 is short-circuited and the secondary windings have no effect on the motor voltages. As indicated by the sequence chart in Fig. 6, the switch 31 is operated alternately to its uppermost and lowermost positions during the progression of the tap-changing switches.

The buckboost transformer may also be utilized to permit the cutting out of one or more motors from the power circuits during the operation of the locomotive, in which case the voltage on the remaining motors may be maintained balanced by the action of the buckboost transformer. It will be understood that the KVA capacity of the buckboost transformer will depend upon the number of motors which may be cut out of service.

Since the sequence relays function to establish the energizing circuits for the corresponding tap-changing switches in a manner hereinbefore described, it is believed to be unnecessary to describe the operation of the present system in detail. Briefly, the sequence relays are energized as the controller advances from one position to the next. The operation of the sequence relays establishes the energizing circuits for the corresponding tap-changing switches. The usual interlocking is provided to prevent improper operation of the switches, such as the simultaneous closing of two switches which are connected to a common bus.

From the foregoing description it is apparent that I have provided a control system which makes it possible to obtain a relatively large number of accelerating steps with a relatively small number of tap-changing switches, since two steps or notches are obtained for each tap switch. Furthermore the loading on the main transformer is uniformly distributed over the secondary winding, since the motors are connected to both ends of this winding. In view of the reduced number of tap-changing switches and the number of taps on the transformer winding, the weight, size and cost of the apparatus are materially reduced.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, and means for transferring the other terminals of the motors from one bank of tap-changing switches to another.

2. In a control system, in combination, a main transformer winding having a plurality of taps thereon, a motor having one terminal connected to one end of the transformer winding, another motor having one terminal connected to the other end of the transformer winding, a plurality of banks of switches for changing taps on said transformer to accelerate the motors, and means for transferring the other terminals of the motors from one bank of tap-changing switches to another at substantially the mid-point of the accelerating cycle.

3. In a control system, in combination, a main transformer winding having a plurality of taps thereon, a motor having one terminal connected to one end of the transformer winding, another motor having one terminal connected to the other end of the transformer winding, a plurality of banks of switches for changing taps on said transformer to accelerate the motors, and switching means for transferring the other terminals of the motors from one bank of tap-changing switches to another.

4. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, switching means for transferring the other terminals of the motors from one bank of tap-changing switches to another, and interlocking means actuated by part of said tap-changing switches for controlling the operation of said switching means.

5. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, switching means for transferring the other terminals of the motors from one bank of tap-changing switches to another at substantially the mid-point of the accelerating cycle, and interlocking means actuated by part of said tap-changing switches for controlling the operation of said switching means.

6. In a control system, in combination, a main transformer winding having a plurality of taps thereon, a motor having one terminal connected to one end of the transformer winding, another motor having one terminal connected to the other end of the transformer winding, a plurality of banks of switches for changing taps on said transformer to accelerate the motors, means for transferring the other terminals of the motors from one bank of tap-changing switches to another, and a balance coil disposed in the motor circuits for equalizing the motor voltages.

7. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, and a balance coil having a winding connected in the circuit for each group of motors to equalize the motor voltages.

8. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, a balance coil having a winding connected in the circuit for each group of motors to equalize the motor voltages, and means for changing taps on said balance coil windings when part of said motors are cut out of service.

9. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, and a buckboost transformer disposed in the motor circuits for equalizing the motor voltages.

10. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, a buckboost transformer disposed in the motor circuits for equalizing the motor voltages, said buckboost transformer having a secondary winding connected in the circuit for each group of motors and a primary winding energized from said main transformer winding.

11. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, a buckboost transformer disposed in the motor circuits for equalizing the motor voltages, said buckboost transformer having a secondary winding connected in the circuit for each group of motors and a primary winding energized from said main transformer winding, and a switch for alternately short-circuiting said primary winding or connecting it to the main transformer winding.

12. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, a buckboost transformer disposed in the motor circuits for equalizing the motor voltages, said buckboost transformer having a secondary winding connected in the circuit for each group of motors, a primary winding energized from said main transformer winding, a switch for alternately short-circuiting said primary winding or connecting it to the main transformer winding, and a controller for controlling the operation of said switch.

13. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, means for transferring the other terminals of the motors from one bank of tap-changing switches to another, a buckboost transformer disposed in the motor circuits for equalizing the motor voltages, said buckboost transformer having a secondary winding connected in the circuit for each group of motors, a primary winding energized from said main transformer winding, a switch for alternately short-circuiting said primary winding or connecting it to the main transformer winding, a controller for controlling the operation of said switch, and relay means cooperating with said controller to control the operation of said tap-changing switches.

14. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, switching means for transferring the other terminals of the motors from one bank of tap-changing switches to another at substantially the mid-point of the accelerating cycle, interlocking means actuated by part of said tap-changing switches for controlling the operation of said switching means, a manually operable controller and relay means cooperating with said controller to control the operation of said tap-changing switches.

15. In a control system, in combination, a main transformer winding having a plurality of taps thereon, a group of motors having one terminal connected to one end of the transformer winding, another group of motors having one terminal connected to the other end of the transformer winding, a plurality of banks of switches for changing taps on said transformer to accelerate the motors, switching means for transferring the other terminals of the motors from one bank of tap-changing switches to another at substantially the mid-point of the accelerating cycle, interlocking means actuated by part of said tap-changing switches for controlling the operation of said switching means, a manually operable controller, relay means cooperating with said controller to control the operation of said tap-changing switches, means for retarding the operation of said controller, and interlocking members actuated by the tap-changing switches for controlling the energization of said retarding means, means for retarding the operation of said controller, and interlocking members actuated by the tap-changing switches for controlling the energization of said retarding means.

LLOYD J. HIBBARD.